United States Patent
Hsu et al.

(10) Patent No.: US 9,341,884 B2
(45) Date of Patent: May 17, 2016

(54) LCOS DEVICE AND METHOD OF FABRICATING THE SAME

(71) Applicant: United Microelectronics Corp., Hsinchu (TW)

(72) Inventors: Yi-Ming Hsu, Hsinchu (TW); Feng-Ying Hsu, Taoyuan County (TW); Chieh-Yu Tsai, Taipei (TW)

(73) Assignee: United Microelectronics Corp., Hsinchu (TW)

( * ) Notice: Subject to any disclaimer, the term of this patent is extended or adjusted under 35 U.S.C. 154(b) by 278 days.

(21) Appl. No.: 14/034,396

(22) Filed: Sep. 23, 2013

(65) Prior Publication Data
US 2015/0085234 A1 Mar. 26, 2015

(51) Int. Cl.
*G02F 1/1335* (2006.01)
*G02F 1/1343* (2006.01)
*G02F 1/1362* (2006.01)
*G02B 5/08* (2006.01)

(52) U.S. Cl.
CPC .... *G02F 1/133553* (2013.01); *G02F 1/134336* (2013.01); *G02F 1/136277* (2013.01); *G02B 5/0816* (2013.01); *G02B 5/0875* (2013.01)

(58) Field of Classification Search
CPC .............. G02B 5/0816; G02B 5/0875; G02F 1/133553; G02F 1/136277
See application file for complete search history.

(56) References Cited

U.S. PATENT DOCUMENTS

| | | | |
|---|---|---|---|
| 6,577,362 B1 * | 6/2003 | Moore | G02F 1/133553 349/113 |
| 8,098,351 B2 * | 1/2012 | Kar-Roy | G02F 1/136277 349/113 |
| 2007/0279540 A1 * | 12/2007 | Hashimoto | G02F 1/136277 349/5 |

* cited by examiner

*Primary Examiner* — Paisley L Arendt
(74) *Attorney, Agent, or Firm* — J.C. Patents

(57) ABSTRACT

The present invention provides a LCOS device including a silicon substrate, a first dielectric layer, a first mirror layer, a second dielectric layer, and a second mirror layer. The first dielectric layer is disposed on the silicon substrate. The first mirror layer is disposed on the first dielectric layer. The second dielectric layer is disposed on the first mirror layer. The second mirror layer is disposed on the second dielectric layer.

16 Claims, 5 Drawing Sheets

LCOS DEVICE AND METHOD OF FABRICATING THE SAME

BACKGROUND

1. Technical Field

The present invention relates to a display device, and more particularly, to a liquid crystal on silicon (LCOS) device and a method of fabricating the same.

2. Description of Related Art

In modern planar display technology, plasma display panels (PDPs) and liquid crystal displays (LCDs) are popular choices. They both constitute numerous display grids called pixel cells. The former is applied in a large-sized market and still has not reached widespread acceptance since the technique for mass production has still not been perfected and because the cost is still high. A thin-film transistor LCD (TFT LCD), which has prevailed in recent years, is representative of the latter one.

A liquid crystal on silicon (LCOS) display is a display which utilizes a silicon chip as a substrate and uses a standard CMOS process to form pixel cell matrices, integrated drivers, and other electronic devices on the silicon chip. An advantage of the LCOS display is the utilization of the CMOS process, since the CMOS process is well developed in the present semiconductor industry. As a result, high stability and reliability can be achieved as compared to the LCD. In addition, using this process, each pixel pitch can be shrunk to less than 10 μm, and therefore high resolutions are obtained.

Moreover, a liquid crystal on silicon display also has the advantages of having small pixel sizes, high brightness, high resolution, simple fabricating processes, low cost, and a small volume. Therefore the liquid crystal on silicon display panels have been applied to video and media equipments, such as handy cameras, digital cameras, projection TVs, and multimedia overhead projectors.

SUMMARY

The present invention is to provide a LCOS device and method of fabricating the same, wherein the LCOS device has an improved reflectance.

The present invention provides a method of fabricating a LCOS device including the following steps. A first dielectric layer is formed on a silicon substrate. A first mirror layer is formed on the first dielectric layer. A second dielectric layer is formed on the first mirror layer. A second mirror layer is formed on the second dielectric layer.

In an embodiment, the method of fabricating a LCOS device further includes forming a liquid crystal material layer on the second mirror layer, and forming a transparent electrode on the liquid crystal material layer.

The present invention provides a LCOS device including a silicon substrate, a first dielectric layer, a first mirror layer, a second dielectric layer, and a second mirror layer. The first dielectric layer is disposed on the silicon substrate. The first mirror layer is disposed on the first dielectric layer. The second dielectric layer is disposed on the first mirror layer. The second mirror layer is disposed on the second dielectric layer.

In an embodiment, the LCOS device further includes a liquid crystal material layer disposed on the second mirror layer.

In an embodiment, the LCOS device further includes a transparent electrode disposed on the liquid crystal material layer.

In an embodiment, the first mirror layer has a first opening and the second mirror layer has a second opening.

In an embodiment, the dimension of the first opening is less than or equal to the dimension of the second opening.

In an embodiment, the first opening and the second opening are identical in shape.

In an embodiment, the first opening and the second opening are different in shape.

In an embodiment, the first opening and the second opening are identical in material.

In an embodiment, the first opening and the second opening are different in material.

In an embodiment, the first opening overlaps with the second opening.

In an embodiment, the first opening is aligned with the second opening.

In an embodiment, a central plane of the first opening and a central plane of the second opening do not coincide with each other.

In an embodiment, the first opening partially overlaps with the second opening.

In an embodiment, the grain size of the material of the second mirror layer is less than the grain size of the material of the first mirror layer.

In an embodiment, the thickness of the second mirror layer is less than the thickness of the first mirror layer.

Accordingly, the present invention provides a LCOS device having multiple (i.e., at least two) mirror layers. With the aid of the additional mirror layer(s), the novel LCOS device has an improved reflectance.

In order to make the aforementioned and other objects, features and advantages of the present invention comprehensible, several non-limiting embodiments accompanied with figures are described in detail below.

BRIEF DESCRIPTION OF THE DRAWINGS

The accompanying drawings are included to provide a further understanding of this invention, and are incorporated in and constitute a part of this specification. The drawings illustrate embodiments of the invention and, together with the description, serve to explain the principles of the invention.

DESCRIPTION OF EMBODIMENTS

Figure 1A:
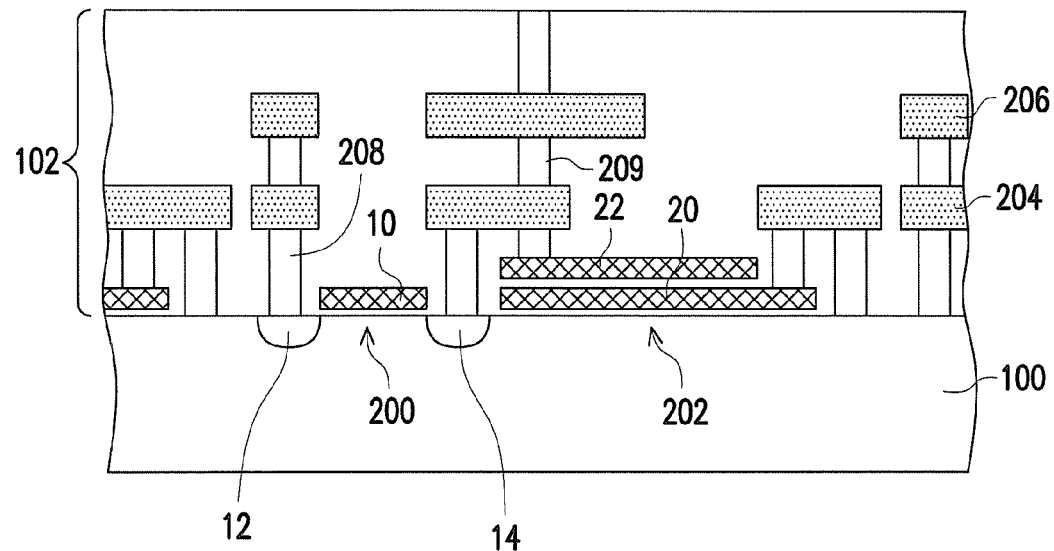
FIGS. 1A-1E illustrate the process flow of a method of fabricating a LCOS device according to an embodiment of the present invention.

Reference will now be made in detail to the embodiments of the invention, examples of which are illustrated in the accompanying drawings. Wherever possible, the same reference numbers are used in the drawings and the description to refer to the same or like elements.

FIGS. 1A-1E illustrate the process flow of a method of fabricating a LCOS device according to the first embodiment of the present invention.

Referring to FIG. 1A, the first embodiment of the present invention includes, at first, providing a silicon substrate 100, and a first dielectric layer 102 is formed on the silicon substrate 100. Various solid-state elements such as a metal-oxide-semiconductor field effect transistor (MOSFET) 200, a storage capacitor 202, metal layers 204 and 206, and a plurality of contacts 208 and vias 209 communicating the metal layers 204 and 206 with other elements are formed in the first dielectric layer 102 and the substrate 100.

In this embodiment, the transistor 200 includes a gate 10, a source region 12, and a drain region 14. The gate 10 includes, for example, polysilicon. The source region 12 and the drain region 14 may respectively be a doped region formed in the substrate 100. For example, if the substrate 100 is a P-type substrate, the source region 12 and the drain region 14 may be respectively doped with an N-type dopant.

Adjacent to the transistor 200 and on the substrate 100 is formed the storage capacitor 202, which includes, in this embodiment, a first electrode layer 20 and a second electrode layer 22 spaced apart from each other. The first electrode layer 20 and the second electrode layer 22 may respectively include conductive material such as polysilicon.

The metal layer 204 is formed on the transistor 200 and the storage capacitor 202, and may include any conductive material (e.g., a metal). Further, a plurality of contacts 208 are formed between the metal layer 204 and the transistor 200, and also between the metal layer 204 and the storage capacitor 202, providing electrical connection therebetween. The contacts 208 include, for example, tungsten (W) or aluminium (Al).

The metal layer 206 is formed on the metal layer 204. Similarly, vias 209 including for example W or Al are formed between the metal layer 204 and the metal layer 206 to provide electrical connection therebetween.

With reference to FIG. 1A some elements of the LCOS device are briefly described as specific examples of the first embodiment. Since these elements are all well-known in the field of LCOS technology, detailed explanation of the fabrication process and the suitable material choices are omitted for a concise description. It should be noticed that the present invention is not limited to the description made above. In fact, these elements may be variously modified, and all of the modification shall fall within the scope of the present invention if the finally resulted LCOS device includes the features as recited in the claims of this specification.

Figure 1B:
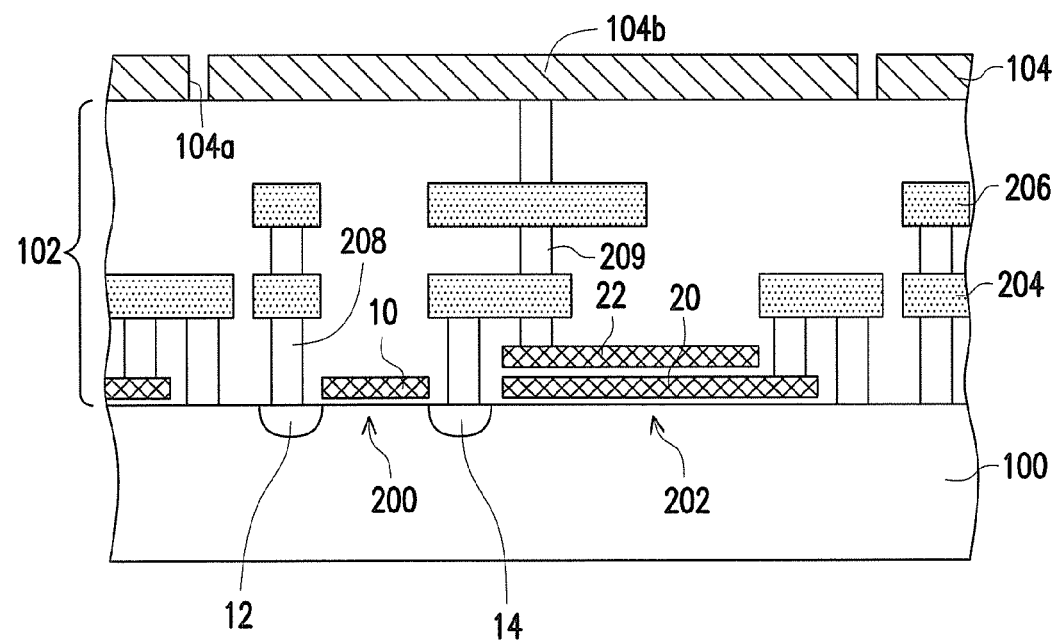

Referring to FIG. 1B, then, a first mirror layer 104 is formed on the first dielectric layer 102. The first mirror layer 104 includes a conductive material with a high reflectivity, such as Al, titanium (Ti), tantalum (Ta), silver (Ag), gold (Au), copper (Cu), or platinum (Pt). The first mirror layer 104 typically includes Al. The thickness of the first mirror layer 104 is not particularly limited but may be preferably in the range of 2000-10000 Å. For example, the first mirror layer 104 may have a thickness of 5000 Å. First openings 104a are formed in the first mirror layer 104 to isolated a portion 104b of the first mirror layer 104 from the other portion thereof. The portion 104b may form a part of a pixel electrode of the later resulted LCOS device, independently controlling the behaviour of the corresponding pixel.

Figure 1C:
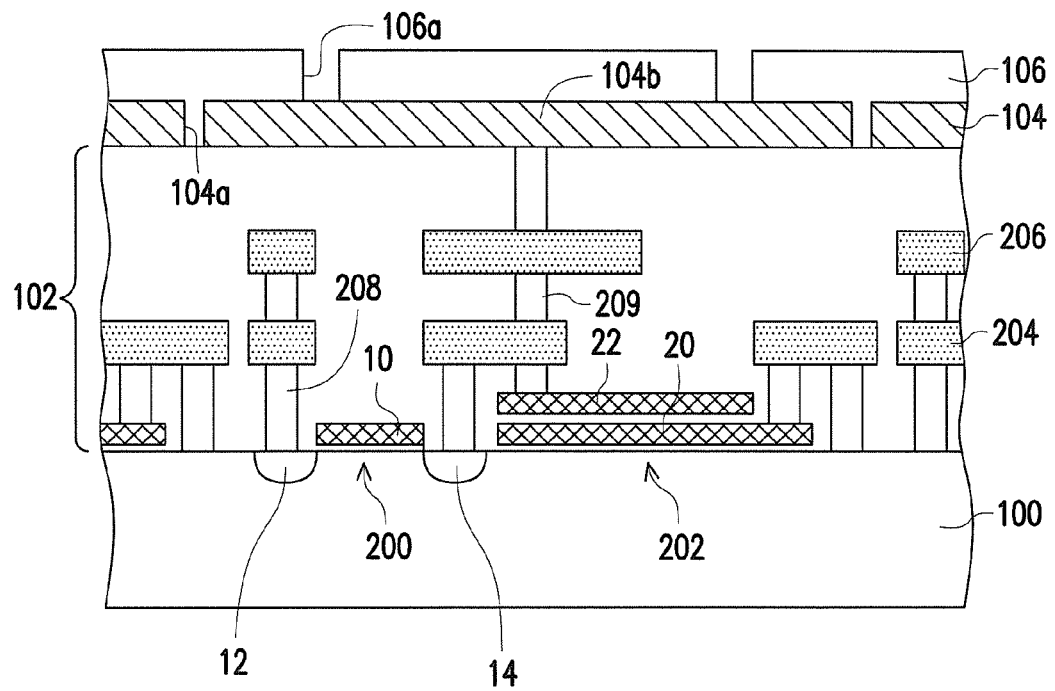

Referring to FIG. 1C, then, a second dielectric layer 106 is formed on the first mirror layer 104. The second dielectric layer 106 may include silicon oxide, and may be formed by, for example, a chemical vapor deposition (CVD) process. Also, holes 106a are formed in the second dielectric layer 106.

Figure 1D:
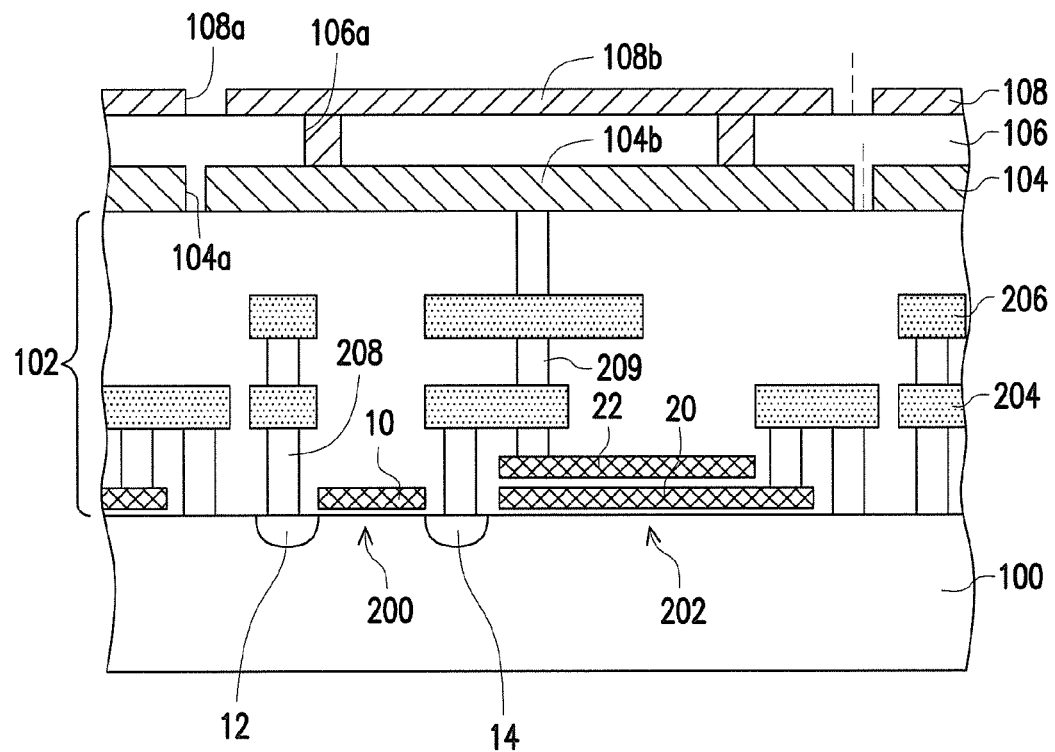

Referring to FIG. 1D, a conductive material, e.g., Al or W, may be filled into the holes 106a to form the contact vias. Then, a second mirror layer 108 is formed on the second dielectric layer 106. The second mirror layer 108 also includes a conductive material with a high reflectivity, such as Al, Ti, Ta, Ag, Au, Cu, or Pt. The material of the second mirror layer 108 may be identical to or different from that of the first mirror layer 104. For example, the second mirror layer 108 may include Al. The second mirror layer 108 also has second openings 108a to isolate a portion 108b thereof, and the portion 108b may serve as, together with the portion 104b and the contacts therebetween, a pixel electrode of the LCOS device. Each of the openings 108a overlaps with the corresponding opening 104a, but the central planes of the first opening 104a and the second opening 108a (as represented by the dotted lines) do not coincide with each other.

The thickness of the second mirror layer 108 is not particularly limited but can be adjusted to achieve an optimal optical properties, and in this embodiment is less than the thickness of the first mirror layer 104 and in a range of, for example, 800-2000 Å. The first mirror layer 104 and the second mirror layer 108 may be formed by similar processes, e.g., a physical vapor deposition (PVD) process but differ in the process duration so as to be different in thickness. In such a situation, the material of the layer formed with a longer deposition duration and thus a greater thickness (in this embodiment, the mirror layer 104) will have a greater grain size. To state it in another way, the grain size of the material of the second mirror layer 108 is less than the grain size of the material of the first mirror layer 104. This may be beneficial in that, a smaller grain size produces a smoother surface, and in turn, a better reflection performance.

Figure 1E:
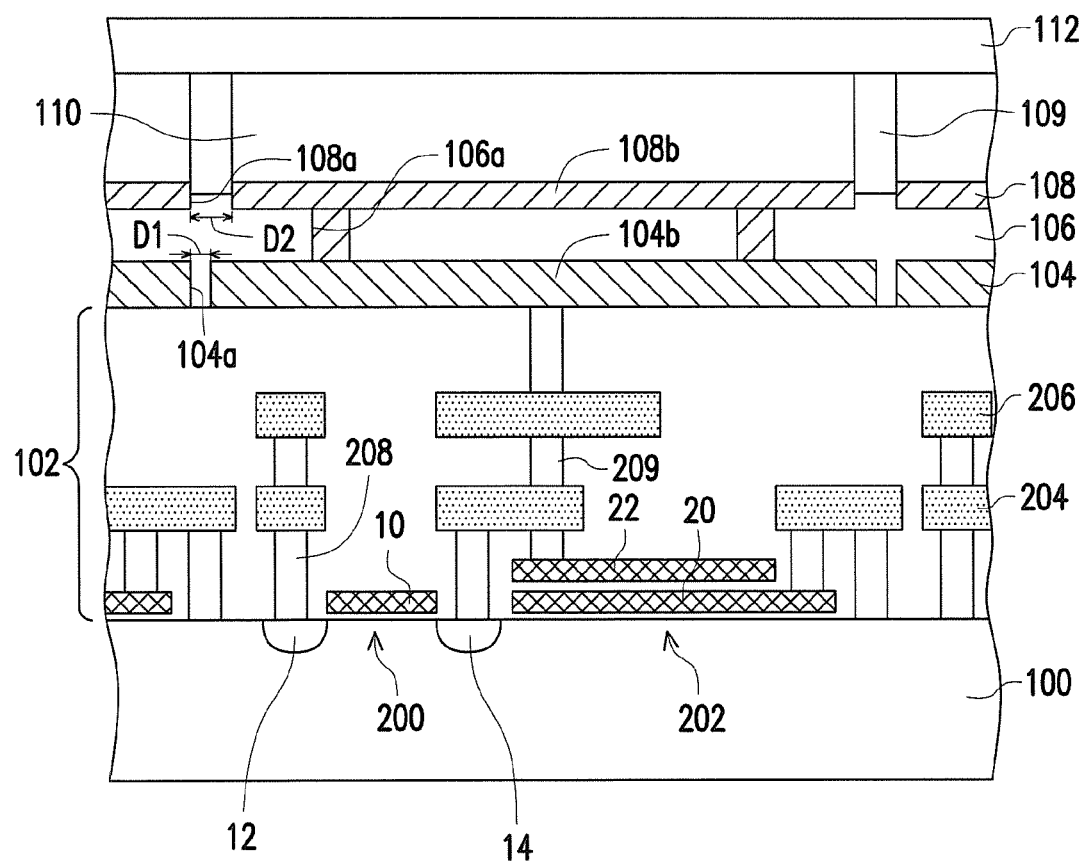

Referring to FIG. 1E, then, spacers 109 may be formed on the second mirror layer 108, and a transparent electrode 112 may be formed on the spacers 109 and the second mirror layer 108. The spacers 109 may be bead spacers or photo spacers. Bead spacers are typically spherically or rod shaped made of resin polymer, silica or glass fiber. Photo spacers are made of photoresists and are patterned by photolithography. The transparent electrode 112 may be a transparent substrate (e.g., a glass plate) coated with a transparent conductive material, e.g., indium-tin-oxide (ITO). Further, a liquid crystal material layer 110 which may include any suitable liquid crystal material may be filled in to the region as defined by a sealant disposed at the periphery of the LCOS device (not shown), the second mirror layer 108, the spacers 109, and the transparent electrode 112, thus completing the fabrication of a LCOS device.

The present invention also provides a second embodiment directed to a LCOS device which will be described with reference to FIG. 1E. The LCOS device of the second embodiment of the present invention includes a silicon substrate 100, a first dielectric layer 102, a first mirror layer 104, a second dielectric layer 106, and a second mirror layer 108. The first dielectric layer 102 is disposed on the silicon substrate 100. The first mirror layer 104 is disposed on the first dielectric layer 102. The second dielectric layer 106 is disposed on the first mirror layer 104. The second mirror layer 108 is disposed on the second dielectric layer 106. In this embodiment, the first mirror layer 104 has a first opening 104a and the second mirror layer 108 has a second opening 108a, while the dimension $D_1$ of the first opening 104a is less than the dimension $D_2$ of the second opening 108a. This arrangement may have a benefit in that light passing through a second opening 108a has a certain possibility to reach the first mirror layer 104 and then reflects backward, thus increasing the reflectivity of the LCOS device.

Conventionally, a LCOS device has only one mirror layer. The reflectance of a conventional LCOS device has attained about 80%. The present invention instead provides a LCOS device having multiple mirror layers, and with the additional mirror layer, it is proved that the reflectance of the LCOS device may by as high as 85-90%, which is a significant improvement.

FIGS. 2A-2D show some other embodiments of the openings of the first mirror layer and the second mirror layer according the present invention.

Figure 2A:
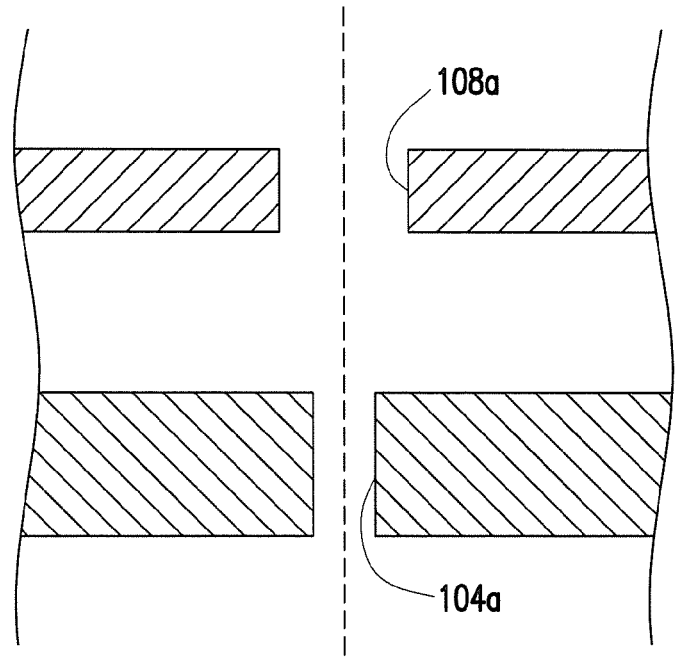
FIGS. 2A-2D illustrate several embodiments of the openings of the first mirror layer and the second mirror layer according the present invention.

In the embodiment shown in FIG. 2A, the dimension of the first opening 104a is less than that of the second opening 108a. Please also note that the first opening 104a overlaps with the corresponding second opening 108a in the direction perpendicular to the surfaces of the mirror layers. This is similar to the situation shown in FIG. 1E, but these two embodiments differ in that, in FIG. 2A, each of the first openings 104a is "aligned" with the corresponding one of the second openings 108a, i.e., both of them share a common central plane, as represented by the dotted line.

Figure 2B:
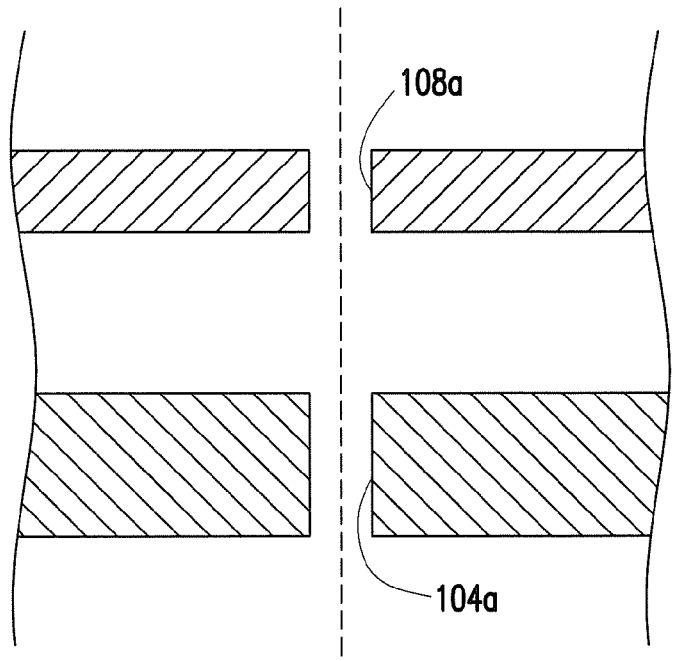

In the embodiment shown in FIG. 2B, the dimension of the first opening 104a is equal to that of the second opening 108a. In addition, the first opening 104a is also aligned with the corresponding second opening 108a.

Figure 2C:
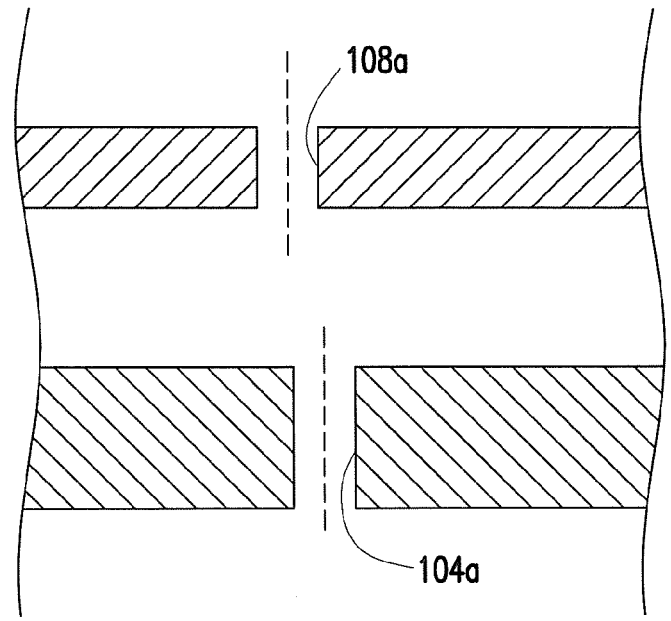

In the embodiment shown in FIG. 2C, the dimension of the first opening 104a is approximately equal to that of the second opening 108a, and the first opening 104a partially overlaps with, but is not aligned to the second opening 108a, that is, the central planes of the first opening 104a and the second opening 108a (as represented by the dotted lines) do not coincide with each other.

Figure 2D:
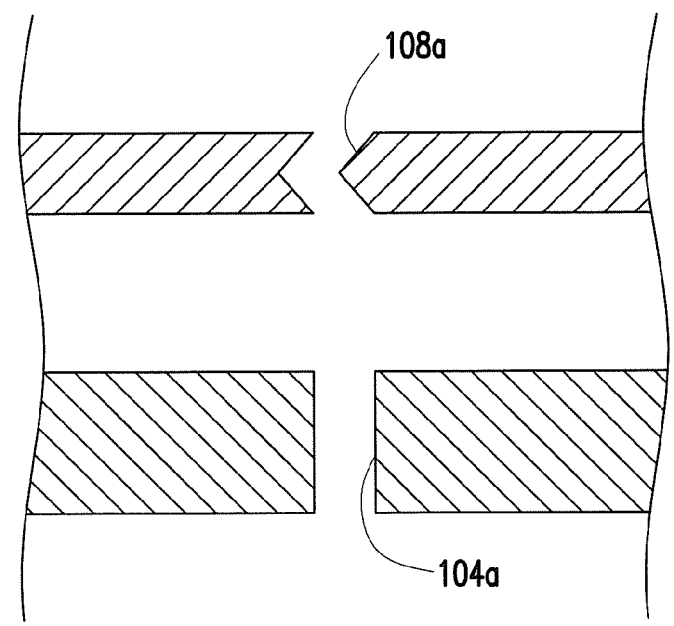

In all embodiments shown in FIGS. 2A-2C, the first opening 104a and the second opening 108a are similar or identical in shape, i.e., having straight side walls. The present invention however is not limited thereto. Referring to FIG. 2D, in this embodiment, the first opening 104a still has straight side walls but the side walls of the second opening 108a are now in a zig-zag shape. Other arrangement, for example, the first opening 104a having a zig-zag side wall and the second opening 108a having a straight side wall, are also possible.

Accordingly, the present invention provides a LCOS device having multiple (i.e., at least two) mirror layers. With the aid of the additional mirror layer(s), the novel LCOS device has an improved reflectance.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A method of fabricating a liquid crystal on silicon (LCOS) device, comprising:
   forming a first dielectric layer on a silicon substrate;
   forming a first mirror layer on the first dielectric layer;
   forming a second dielectric layer on the first mirror layer; and
   forming a second mirror layer on the second dielectric layer,
   wherein a grain size of a material of the second mirror layer is less than a grain size of a material of the first mirror layer,
   wherein a width of the first mirror layer is wider than a width of the second mirror layer, the grain size of the material of the first mirror layer and the grain size of the material of the second mirror layer are capable of providing improved reflectance, a thickness of the first mirror layer is in a range of 2000-10000 Å, and a thickness of the second mirror layer is in a range of 800-2000 Å.

2. The method of claim 1, further comprising:
   forming a liquid crystal material layer on the second mirror layer; and
   forming a transparent electrode on the liquid crystal material layer.

3. A liquid crystal on silicon (LCOS) device, comprising:
   a silicon substrate;
   a first dielectric layer disposed on the silicon substrate;
   a first mirror layer disposed on the first dielectric layer;
   a second dielectric layer disposed on the first mirror layer; and
   a second mirror layer disposed on the second dielectric layer,
   wherein a grain size of a material of the second mirror layer is less than a grain size of a material of the first mirror layer,
   wherein a width of the first mirror layer is wider than a width of the second mirror layer, the grain size of the material of the first mirror layer and the grain size of the material of the second mirror layer are capable of providing improved reflectance, a thickness of the first mirror layer is in a range of 2000-10000 Å, and a thickness of the second mirror layer is in a range of 800-2000 Å.

4. The LCOS device of claim 3, further comprising a liquid crystal material layer disposed on the second mirror layer.

5. The LCOS device of claim 4, further comprising a transparent electrode disposed on the liquid crystal material layer.

6. The LCOS device of claim 3, wherein the first mirror layer has a first opening and the second mirror layer has a second opening.

7. The LCOS device of claim 6, wherein a dimension of the first opening is less than or equal to a dimension of the second opening.

8. The LCOS device of claim 6, wherein the first opening and the second opening are identical in shape.

9. The LCOS device of claim 6, wherein the first opening and the second opening are different in shape.

10. The LCOS device of claim 6, wherein the first opening and the second opening are identical in material.

11. The LCOS device of claim 6, wherein the first opening and the second opening are different in material.

12. The LCOS device of claim 6, wherein the first opening overlaps with the second opening.

13. The LCOS device of claim 12, wherein the first opening is aligned with the second opening.

14. The LCOS device of claim 12, wherein a central plane of the first opening and a central plane of the second opening do not coincide with each other.

15. The LCOS device of claim 6, wherein the first opening partially overlaps with the second opening.

16. The LCOS device of claim 6, wherein the thickness of the second mirror layer is less than the thickness of the first mirror layer.

* * * * *